(12) United States Patent
Jahan

(10) Patent No.: US 12,177,056 B2
(45) Date of Patent: Dec. 24, 2024

(54) METHOD FOR TELECOMMUNICATION WITH SYMBOL BINARY REPETITION CODING AND CORRESPONDING DEVICES

(71) Applicant: ORANGE, Issy-les-Moulineaux (FR)

(72) Inventor: Bruno Jahan, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 51 days.

(21) Appl. No.: 18/252,256

(22) PCT Filed: Nov. 9, 2021

(86) PCT No.: PCT/FR2021/051982
§ 371 (c)(1),
(2) Date: May 9, 2023

(87) PCT Pub. No.: WO2022/101577
PCT Pub. Date: May 19, 2022

(65) Prior Publication Data
US 2023/0412441 A1 Dec. 21, 2023

(30) Foreign Application Priority Data
Nov. 10, 2020 (FR) ........................................ 2011554

(51) Int. Cl.
*H04L 27/26* (2006.01)
(52) U.S. Cl.
CPC ...... *H04L 27/2634* (2013.01); *H04L 27/2643* (2013.01); *H04L 27/2647* (2013.01)

(58) Field of Classification Search
CPC ... H04L 1/08; H04L 27/2634; H04L 27/2643; H04L 27/2647; H04L 27/3405; H04L 27/2697
See application file for complete search history.

(56) References Cited

U.S. PATENT DOCUMENTS

| | | | |
|---|---|---|---|
| 2009/0022242 A1* | 1/2009 | Waters | H04L 1/0068 375/299 |
| 2011/0206014 A1* | 8/2011 | Lee | H04L 1/08 370/335 |
| 2011/0255620 A1* | 10/2011 | Jones, IV | H04L 27/22 375/260 |
| 2012/0315938 A1* | 12/2012 | Van Nee | H04B 7/0615 455/507 |

FOREIGN PATENT DOCUMENTS

EP 1763166 A1 3/2007

OTHER PUBLICATIONS

International Search Report dated Mar. 4, 2022 for corresponding International Application No. PCT/FR2021/051982, filed Nov. 9, 2021.

(Continued)

*Primary Examiner* — Khanh C Tran
(74) *Attorney, Agent, or Firm* — David D. Brush; Westman, Champlin & Koehler, P.A.

(57) ABSTRACT

A telecommunication method which includes: mapping, with a mapper, input data to points of a constellation in order to generate symbols, repeating symbols according to a pattern, modulating the symbols, with a modulator, in order to generate multi-carrier symbols, and transmitting a radio signal representative of the multi-carrier symbols.

20 Claims, 6 Drawing Sheets

(56) References Cited

OTHER PUBLICATIONS

Written Opinion of the International Searching Authority dated Mar. 4, 2022 for corresponding International Application No. PCT/FR2021/051982, filed Nov. 9, 2021.
Ugolini Alessandro et al., "Spiral Constellations for Phase Noise Channels", Nov. 1, 2019 (Nov. 1, 2019), vol. 67, No. 11, p. 7799-7810, XP011757246.
Cheng, X. et al., "Effective mirror-mapping-based intercarrier interference cancellation for OFDM underwater acoustic communications", Ad Hoc Networks 34 (2015) 5-16, Aug. 7, 2014.
Larsson, P., "Golden Angle Modulation: Geometric- and Probabilistic-shaping", IEEE, Aug. 24, 2017.
Ngajikin, N. et al., "PAPR Reduction in WLAN-OFDM System Using Code Repetition Technique", Student Conference on Research and Development (SCOReD) 2003 Proceedings, Malaysia.
English translation of the Written Opinion of the International Searching Authority dated Mar. 4, 2022 for corresponding International Application No. PCT/FR2021/051982, filed Nov. 9, 2021.
Ugolini, A et al., "Spiral Constellations for Phase Noise Channels", IEEE Transactions on Communications, vol. 67, No. 11, Nov. 2019.

\* cited by examiner

METHOD FOR TELECOMMUNICATION WITH SYMBOL BINARY REPETITION CODING AND CORRESPONDING DEVICES

CROSS-REFERENCE TO RELATED APPLICATIONS

This application is a Section 371 National Stage Application of International Application No. PCT/FR2021/051982, filed Nov. 9, 2021, which is incorporated by reference in its entirety and published as WO 2022/101577 A1 on May 19, 2022, not in English.

FIELD OF THE INVENTION

The present invention relates to the field of telecommunications. Within this field, the invention more specifically relates to digital communications involving the transmission of a radio signal (6G, 5G, Wi-Fi, etc.) that uses multi-carrier modulation with reliability constraints with regard to phase variations.

It particularly applies to access points and to portable telecommunication devices compatible with standards (6G, etc.) for which the transmission frequency band extends beyond Giga Hertz.

PRIOR ART

Digital communications refer to digital transmission chains that use well-known signal processing modules as illustrated in FIG. 1.

A conventional chain is schematically shown in FIG. 1. This chain retrieves input data Bit derived from a binary source, such that the binary data represents, for example, an audio signal (voice), a multi-media signal (television stream, Internet stream), etc. The input data are encoded by an error correction encoder COD (for example, Turbo Code, LDPC, Polar Code). An interleaver ENT interleaves the encoded data. A symbol binary encoder MAP converts a binary data packet, for example, a codeword, into a point of a constellation (BPSK, QPSK, mOAM, etc.).

This encoder MAP is also called mapper and it is similarly said that the mapper maps the input data to the points of the constellation. The output symbols of this mapper are made up of the symbols of the constellation according to the mapping of the input data or, similarly, mapped data are referred to in order to designate the output symbols. The symbols are modulated by a multi-carrier modulator MOD with N sub-carriers in order to generate multi-carrier symbols. The output of the modulator supplies a power amplifier of the transmitter in order to transmit a radio signal.

It should be noted that the 'm' of the expression mQAM (Quadrature Amplitude Modulation) designates the modulation order. The symbol binary encoder allows projection, also called mapping, of the binary data derived from the channel encoder (error correction encoder) onto a two-axis plane following a given constellation. Each point of the constellation thus conveys a packet formed by one or more bits. For example, for mapping to BPSK, QPSK or mQAM constellations, the number of bits that can be mapped to a given point of the constellation is as follows:

1 bit for a BPSK;
2 bits for a QPSK or a 4-QAM;
3 bits for an 8-QAM;
4 bits for a 16-QAM, etc.

Among the multi-carrier modulations, OFDM (Orthogonal Frequency-Division Multiplexing) modulation has proved to be the reference modulation since it was adopted in the various standards such as DAB, DVBT, ADSL, 4G and 5G.

The intrinsic qualities of this OFDM modulation have ensured its success in the aforementioned standards. The following can be cited among these qualities: that associated with a spectrum that is less spread than that of a single-carrier modulation, that associated with the resistance to the dispersive channels over time, and that associated with the reception that can occur with a simple equalization with one coefficient per carrier (i.e., ZF (Zero Forcing) processing).

FIG. 2 illustrates the output of a modulator implementing OFDM modulation. Such an OFDM modulator is often produced by means of an inverse Fourier transform (IFFT). The various carriers of an OFDM symbol are modulated with the points of the constellation to which the data packets have been mapped. The frequency interval between carriers is $1/t_s$, with $t_s$ being the duration of an OFDM symbol. A guard interval of duration $\Delta$ is inserted between two successive OFDM symbols symb. This guard interval allows the echoes to be absorbed that are caused by the multiple reflections during radio transmissions by the channel, which is generally air. This interval can be used to carry out a first time synchronization, called rough time synchronization, of the system (between a transmitter and a receiver). It can thus allow, upon reception, the FFT window to be positioned before demodulating the received radio signal. Implementing the FFT upon reception allows the inverse processing of the IFFT to be carried out that is implemented upon transmission, i.e., allows the received OFDM symbols to be demodulated.

FIGS. 3, 4 and 5 represent mapping to a QPSK, a 16-QAM or a 64-QAM, respectively, in accordance with Gray coding. The Gray coding is such that, between a point of the constellation and each of the closest points, the bit packets mapped to these two points differ by only one bit. This particular feature has the advantage of limiting the number of bits assigned by a poor evaluation of the received constellation point upon reception.

FIGS. 4 and 5 illustrate the fact that the higher the modulation order m, the more binary information the system transmits and can reach a high transmission rate and therefore improve the spectral efficiency of the system. However, the higher the modulation order, the less the system resists the disturbances related to the channel and to the Additive White Gaussian Noise (AWGN).

Thus, the selection of the modulation order must take into account the quality of the transmission link in order to hope to achieve the maximum possible rate.

Quadrature Amplitude Modulation (QAM: Quadrature Amplitude Modulation) on two carriers can be referred to as "Cartesian" mapping. This mapping is generally associated with Gray coding. Even though for the same radio access system (RAN) several types of mapping can be specified, QAM mapping is used the most. Indeed, it ensures a uniform Euclidean distance between the points of the constellation and it can be simply decoded with threshold solutions. QAM mapping thus allows high rates to be guaranteed. QAM mapping is used, for example, in the DVB-T, IEEE 802.11 (Wi-Fi), 3GPP 4G (release and following) standards and recently in the 3GPP 5G standard (release 15 and following).

The error correction encoder COD, also called channel encoder, implements a code that is generally based on a "mother" code or base code with which a base rate corresponds. Thus, the base code is ½ for a double-binary turbo code, it is more often ⅓, or even ⅕ for the new LDPC codes of the 3GPP 5G standard. FIG. 6 illustrates a ⅓ rate turbo encoder. The turbo encoder comprises a first encoder Encod I, a second encoder Encod II and an interleaver π. The output data includes a systematic part made up of the input data $x_i$ and a redundant part $y_i$. The redundant part $y_i$ includes the encoded data $y_1$ and the encoded data $y_2$. The encoded data $y_1$ are derived from the encoding by the first encoder Encod I of the input data $x_i$. The encoded data $y_2$ are derived from the encoding by the second encoder Encod II of the interleaved input data $x_i$. The data derived from the channel encoding are subsequently punctured in order to adapt to the desired coding rate (⅔, ¾, etc.).

The encoding allows redundancy to be introduced into the binary data in order to combat disturbances that are generally introduced by the transmission channel and that result in deletions or errors that are particularly due to fading phenomena.

In order to obtain more reliable communication systems, one approach involves reducing the coding rate (number of useful bits/total number of bits). The 5G standard has thus provided coding rates of the order of (⅕, ¹⁄₁₀ and ¹⁄₂₀) in order to address the new services, called "Ultra-Reliable Low-Latency Communication" (URLLC) services, which must particularly address the requirements of telemedicine. In order to obtain these very low rates, the solution adopted by the 5G standard involves repeating the data derived from the base encoder.

Repeating the encoded data is a simple solution and it provides satisfactory results in terms of the reliability of the system for a 'Gaussian' channel.

However, some contemplated scenarios associated with the new standards, such as 5G or with future standards, rely on an ever increasing data rate, which requires shifting or widening the radio spectrum in or toward the high bands, i.e., millimetric bands (around 26 GHz in France) and in the near future (evolutions of the 5G standard, 6G standard) in even higher bands: TeraHertz.

However, the more the transmission frequencies increase, the greater the imperfections of the oscillators, introducing phase variations in addition to those due to the Doppler effect associated with the movement of the receiver. Furthermore, the limited number of quantization bits for analogue-to-digital and digital-to-analogue converters (ADC and DAC) result in a lower signal-to-noise ratio in TeraHertz than for lower frequency bands.

Therefore, a requirement exists for a telecommunication method taking into account reliability constraints related to phase variations and that can be compatible with a transmission frequency band that can extend beyond GigaHertz.

SUMMARY

An exemplary embodiment of the invention relates to a telecommunication method comprising encoding of rate r1 with a binary encoder, mapping data with a mapper to points of a constellation in order to obtain symbols, multi-carrier modulation with a modulator with N sub-carriers with mapping of the symbols to the N sub-carriers and transmitting the multi-carrier symbols. The method comprises:

repeating symbols before mapping to the N sub-carriers of the modulator.

Repeating the symbols derived from the mapper allows the reliability of the transmission to be increased with regard to the fading introduced by the propagation channel and with regard to phase noises. Furthermore, the method does not modify the energy of the multi-carrier signal or its spectrum, while maintaining significantly limited complexity.

A further exemplary embodiment of the invention relates to a reception method comprising:
demodulating a received multi-carrier symbol in order to estimate N symbols;
averaging the repetitions of the same symbol in order to estimate a symbol of a constellation;
demapping the symbols in order to estimate data mapped to these constellation symbols;
decoding the data.

A further exemplary embodiment of the invention relates to a telecommunication equipment, which comprises:
a binary encoder of rate r1;
a mapper for mapping input data to points of a constellation and for generating symbols;
a modulator with N sub-carriers for modulating a block of N symbols made up of L symbols and at least one repetition of at least one of the L symbols, with the repetitions defining a new rate r2=r1×L/N, for generating multi-carrier symbols;
a transmitter for transmitting a radio signal representing the multi-carrier symbols.

A further exemplary embodiment of the invention relates to a telecommunication equipment, which comprises:
a demodulator with N sub-carriers for demodulating a received multi-carrier symbol and estimating N symbols;
a derepeater for averaging the repetitions of the same symbol and for estimating a symbol of a constellation;
a demapper for demapping L constellation symbols and estimating data mapped to these constellation symbols;
a decoder for decoding the data.

A further exemplary embodiment of the invention relates to a transmitted or received digital signal comprising a multi-carrier symbol constructed from symbols of a polar constellation, at least one of the symbols of which has been repeated before multi-carrier modulation in order to form a repetition pattern, with a polar constellation comprising a set of M points, the coordinates of which expressed in polar form $a_m \times e^{j\varphi_m}$, m=0, . . . , M−1, called polar coordinates with reference to a two-axis representation delimiting four quadrants, are determined such that $a_{m+1}=a_m+p$, with p being a positive real number representing the amplitude pitch of the constellation.

According to one embodiment, the same number of repetitions is applied to all the symbols before mapping.

According to one embodiment, among the N symbols mapped to the N sub-carriers, at least one symbol is not repeated or its number of repetitions is different from the number of repetitions of another symbol.

According to one embodiment, the number of repetitions is determined in order to obtain a rate r2 that is less than r1.

According to one embodiment, the method further comprises interleaving, after repetition, of the N symbols mapped to the N sub-carriers.

According to one embodiment, the constellation comprises a set of M points, the coordinates of which expressed in polar form $a_m \times e^{j\varphi_m}$, m=0, . . . , M−1, called polar coordinates with reference to a two-axis representation, are determined such that $a_{m+1}=a_m+p$, p>0, with p being a real number representing the amplitude pitch of the constellation.

A polar constellation according to the invention comprises a set of M points, the coordinates of which are expressed in polar form $a_m \times e^{j\varphi_m}$.

A phase shift on one or more of the points mapped to the carriers can occur during the transmission, for example, due to a Doppler effect associated with a movement of the transmitter and/or of the receiver, or due to any imperfections of the oscillators. Despite this variation, the receiver advantageously can unambiguously determine the points received from the constellation. Indeed, the polar constellation allows absorption up to a certain phase shift value that is determined by the number of points of the constellation on the same circle.

The polar constellation that is used also allows the resilience of the system to be enhanced with regard to the phase variations caused by the imperfections of the oscillators, in particular for high frequencies beyond 6 GHz.

According to one embodiment, the pitch is a parameter.

Thus, the telecommunication method according to the invention allows various constraints to be addressed with regard to variations in amplitude (noise) by modifying the value of the pitch, which is configurable. Therefore, this method is highly flexible and adaptable as a function of the noise constraints.

According to one embodiment, the two axes delimit quadrants and the polar coordinates are determined per quadrant:

$$a_{m+1} = a_m + p, m = 0, \ldots, \frac{M}{4} - 1.$$

This embodiment allows high modulation orders to be used to meet the increasing rate demand, even in the absence of pilots, while allowing a phase variation to be absorbed that can range up to $\pi/2$ by limiting the number of points on the same circle to four.

According to one embodiment, for each quadrant $$\varphi_{m+1} = \varphi_m, m = 0, \ldots, \frac{M}{4} - 1.$$

The polar constellation according to this embodiment is defined per quadrant and is replicated between the various quadrants, with the particular feature that the phase of the points is the same within a quadrant. This embodiment allows average modulation orders to be used to meet the increasing data rate demand, even in the absence of pilots, while allowing a phase variation to be absorbed that can range up to $\pi/2$ by limiting the number of points on the same circle to four.

According to one embodiment, M=16, p=1 and for each quadrant $\varphi_m = \alpha \times \pi/12$ with $\alpha$ being a natural number.

This embodiment is particularly advantageous because the symbols that are obtained can be demodulated by a conventional demodulator, they are compatible with demodulators adapted to the conventional 16-QAM modulation, according to which the four points of a quadrant are distributed as a square.

According to one embodiment, the two axes delimit quadrants and the polar coordinates are determined per set of two quadrants:

$$a_{m+1} = a_m + p, n = 0, \ldots, \frac{M}{2} - 1.$$

This embodiment allows high modulation orders to be used to meet the increasing rate demand, even in the absence of pilots, while allowing a phase variation to be absorbed that can range up to a by limiting the number of points on the same circle to two.

According to one embodiment, the two axes delimit quadrants and for two quadrants taken together $$\varphi_{m+1} = \varphi_m, m = 0, \ldots, \frac{M}{2} - 1.$$

The polar constellation according to this embodiment is defined per block of two quadrants and is replicated between these two blocks with the particular feature that the phase of the points is the same within a block.

According to one embodiment, the polar coordinates are also determined such that $\varphi_{m+1} = \varphi_m p' = \varphi_m + p'''' \times \pi$, with $p''''$ being a non-zero real number.

This embodiment uses 'spiral' constellations defined on the set of quadrants, i.e., $2\pi$, that is to say that the four quadrants are considered as a whole. This embodiment of the method allows a phase variation to be introduced that can range up to $2\pi$ over any point of the constellation. Although no transmission of phase rotation information to the receiver occurs according to the method, the receiver can unambiguously determine the received constellation points since the constellation allows any phase rotation to be absorbed up to $2\pi$. Such an embodiment is particularly suitable for systems experiencing a lot of phase noise, which is the case when the communications occur in the TeraHz band. Indeed, the oscillators have a lot of phase noise at these frequencies. Spiral constellations allow both good immunity to noise and good immunity to phase variations to be achieved and are therefore particularly advantageous for communications in the TeraHz domain.

This embodiment is as reliable in terms of phase variations as an embodiment in which all the points of the constellation have the same phase, but it also advantageously increases the minimum Euclidean distance of the points of the constellation.

According to one embodiment, the polar coordinates are also determined such that $\varphi_m = \varphi$ for m=0, ..., M−1.

The polar constellation according to this embodiment comprises points that all have the same phase with a constant amplitude pitch between two neighboring pitches. This type of polar constellation exhibits high immunity to phase variations, i.e., up to $2\pi$, but relatively low immunity to noise.

According to one embodiment, the modulation is implemented by an inverse Fourier transform.

The inverse Fourier transform allows the transformation from a frequency domain to a time domain to be carried out efficiently and simply and allows an OFDM symbol to be obtained.

According to one embodiment, the method further comprises:
  estimating, per constellation symbol, a phase error by comparing projections on quadrature axes of the symbol with the points of the constellation;
  correcting the constellation symbols by a common phase error after averaging the estimated phase errors.

The advantages of the methods are also those of the devices, and vice versa.

LIST OF FIGURES

Further features and advantages of the invention will become more clearly apparent upon reading the following description of embodiments, which are provided by way of simple illustrative and non-limiting examples, and the accompanying drawings, in which.

DESCRIPTION OF PARTICULAR EMBODIMENTS

Figure 1:
FIG. 1 is a diagram illustrating a transmission baseband processing chain according to the prior art.
Figure 2:
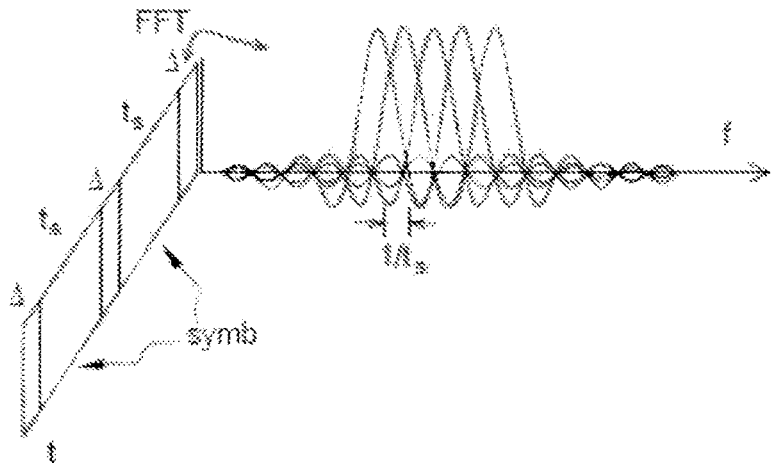
FIG. 2 is a conventional time-frequency representation of OFDM symbols.
Figure 3:
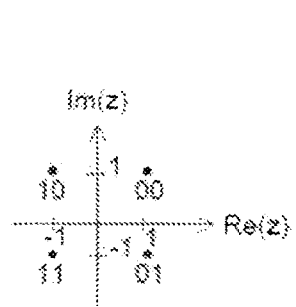
FIG. 3 is a representation of a conventional QPSK constellation.

The general principle of the invention relies on repeating symbols derived from binary symbol encoding and before they are modulated by a multi-carrier modulator. The symbols correspond to points of the constellation used for transmission. The invention thus allows redundancy to be introduced closer to the modulation than a channel encoder and to more effectively combat disturbances (fading) introduced by the channel or with regard to phase noise. All the symbols derived from the mapper can be repeated in an identical number or in different numbers between the symbols. When at least one repetition number is different from the others, the method can involve repeating in the same number R all the symbols and then removing the surplus copies of symbols in order to reach the one or more respective repetition number(s). The deletion then can be associated with puncturing the symbols in order to reach the number of repetition(s) defined per symbol derived from the mapper. The repetition number(s) and the possible deletion of repetition(s) are in accordance with a pattern mot that determines a rate. Thus, by adjusting the numbers of repetition(s) for the various symbols derived from the mapper, the method allows highly variable rates to be obtained over a wide range. Several patterns can correspond to a rate. A pattern corresponds to a single rate.

The following example is based on a QAM constellation. The points Qi of the constellation are complex and can be expressed as follows: $Qi=ai+jbi$. The values ai and bi of each constellation point output from the mapper depend on the binary data di of the stream at the input of the mapper. The binary stream typically comprises data that has been encoded upstream in the transmission chain by a channel encoder.

By considering that the output of the mapper is as follows: Q0, Q1, Q2, Q3 for a base rate $\eta$.

The repetition of certain symbols according to the invention allows different rates to be obtained.

For example:

a rate $\eta/2$ can be obtained with the pattern: Q0, Q0, Q1, Q1, Q2, Q2, Q3, Q3;

a rate $\eta/3$ can be obtained with the pattern: Q0, Q0, Q0, Q1, Q1, Q1, Q2, Q2, Q2, Q3, Q3, Q3;

a rate $\eta/4$ can be obtained with the pattern: Q0, Q0, Q0, Q0, Q1, Q1, Q1, Q1, Q2, Q2, Q2, Q2, Q3, Q3, Q3, Q3;

a rate $2\eta/5$ can be obtained with the pattern: Q0, Q0, Q0, Q1, Q1, Q2, Q2, Q2, Q3, Q3.

The one or more repetition(s) of the same output symbol of the mapper can be contiguous, as illustrated above, or non-contiguous. Interleaving can be carried out on the succession of symbols with contiguous repetition(s) in order to obtain a sequence of the symbols in which at least one repetition or even all the repetitions are not contiguous. This interleaving can occur simultaneously with the mapping of the symbols on the sub-carriers.

According to one embodiment, the constellation is a polar constellation. A polar constellation is defined by M points distributed over concentric circles with a constant pitch p between the circles. These constellations have the advantage of being less sensitive to the phase variations derived from the Doppler effect or derived from the imperfections of the oscillators than other conventional constellations such as QAM constellations.

The polar constellation is based on a polar and non-Cartesian base in order to be invariant with respect to the phase variations.

Polar Constellations According to the Invention.

The pitch p is a non-zero positive real number. The points of the constellation are therefore distributed over at least two distinct circles. The M points have coordinates expressed in polar form $c(m)=a_m \times e^{j\varphi_m}$, m=0, ..., M−1, called polar coordinates with reference to a two-axis representation delimiting four quadrants of size π/2, with the constraint that $a_{m+1}=a_m+p$. $a_m$ is the amplitude of a point, $\varphi_m$ is the phase of this point. M is the order of the modulation.

For example, a 16-QAM modulation has an order M=16.

The particular feature of the constellation is that there is at most one point on each circle per considered quadrant for expressing the constellation in polar form. When the constellation is determined on a quadrant of size 2π, that is the quadrant [0–2π[, then there is at most one point per circle. When the constellation is determined by a quadrant of size π, that is for the quadrants $$[0, \pi[ \text{ and } [\pi, 0[ \text{ or } \left[\frac{\pi}{2}, 3\frac{\pi}{2}\right[ \text{ and } \left[3\frac{\pi}{2}, 0\right[,$$

then there is at most one point per semicircle. When the constellation is determined by a quadrant of size π/2, that is for the quadrants $$[0, \pi/2[, [\pi/2, \pi[, \left[\pi, 3\frac{\pi}{2}\right[ \text{ and } \left[3\frac{\pi}{2}, 0\right[,$$

then there is at most one point per quarter of a circle.

The Cartesian coordinates (x,y) before normalization corresponding to the polar coordinates of the points of the constellation are expressed as follows:

$$x_m = a_m \cdot \cos(\varphi_m); y_m = a_m \cdot \sin(\varphi_m), \text{ with } \varphi_m \in [0-2\pi[.$$

By configuring a pitch p=1 and considering that the amplitude of the first point equals one, then: $a_0=1$ and $a_{m+1}=a_m+1$.

Figure 7:
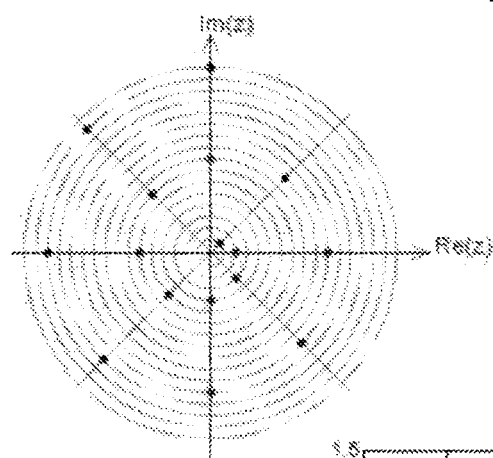
FIG. 7 is a representation of a spiral polar constellation.

FIG. 7 shows a first configuration of a polar constellation, called spiral constellation, that is used according to the invention. This first configuration has the particular feature that the points are distributed over a quadrant that represents [0–2π[. The configuration shown corresponds to a constellation of the order M=16. Each point has the following coordinates: $a_m \times e^{j\varphi_m}$, $a_m=(m+1) \times p$, m=0, . . . , 15 and a phase $\varphi_m$, with a phase shift that is determined between two successive points, i.e., on two successive circles, for example, a constant shift of π/4, $\varphi_{m+1}=\varphi_m+\pi/4$. The successive points of the spiral constellation thus have a constant shift both in amplitude and in phase. Therefore, unlike configurations that are not illustrated, the phase $\varphi_m$ is not constant but varies between the successive points. This first configuration is particularly advantageous with regard to phase variations because the demodulation upon reception can be carried out on only one detection of amplitude of the received constellation points. Any phase variation during the transmission between the transmitter and the receiver does not affect the demodulation.

Figure 8:
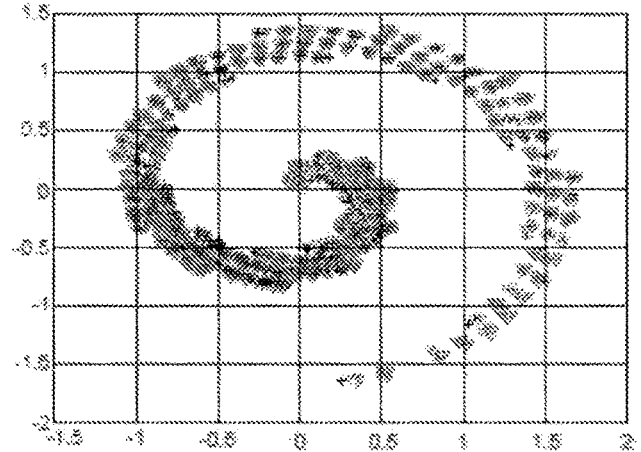
FIG. 8 is an illustration of the result of a frequency shift between the transmitter and the receiver with the spiral constellation of FIG. 7.

FIG. 8 illustrates the result of a frequency shift between the transmitter and the receiver with the constellation defined above on several consecutive OFDM symbols. FIG. 8 illustrates an example of the phase variation that can affect the points of the 'spiral' modulation, illustrated in FIG. 7, which remains acceptable for obtaining correct demodulation. This 'spiral' structure allows high phase variations to be resisted between the transmitter and the receiver of the system. This embodiment is particularly suitable for systems operating in TeraHertz, for which there is significant phase noise due to low-performance oscillators.

Figure 9:
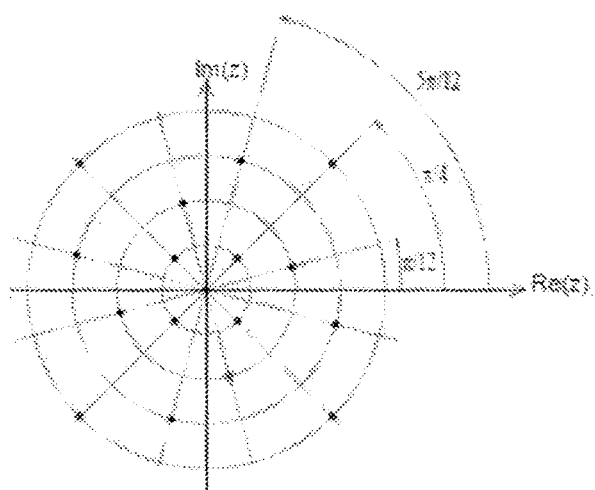
FIG. 9 is a representation of a polar constellation defined per quadrant of $\pi/2$.

FIG. 9 represents a second configuration of a polar constellation used according to the invention. This constellation is of the order M=16. It has the particular feature that the pattern of the points is reproduced between the four quadrants, with each quadrant representing [0, π/2[. Each point of a quadrant has the following coordinates:

$$a_m \times e^{j\varphi_m}, a_m = (m+1) \times p, m = 0, \ldots, \frac{M}{4} - 1, M = 16.$$

Figure 4:
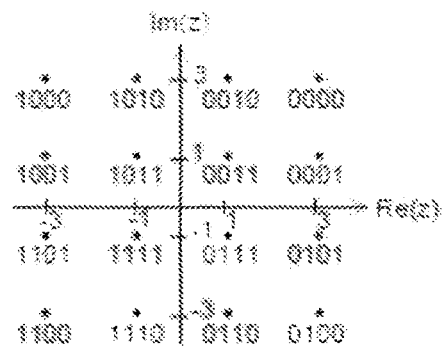
FIG. 4 is a representation of a conventional 16-QAM constellation.
Figure 5:
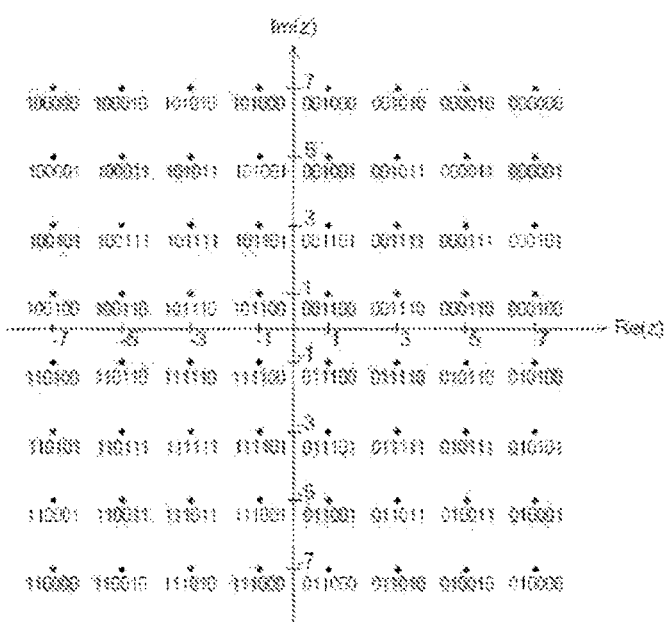
FIG. 5 is a representation of a conventional 64-QAM constellation.
Figure 6:
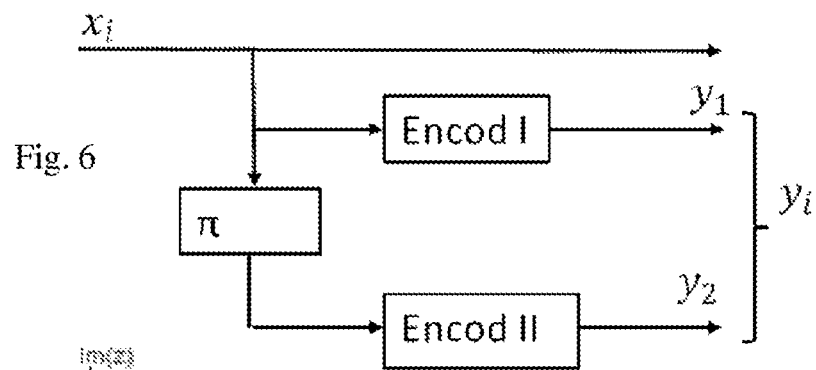
FIG. 6 is a diagram of a ⅓ rate turbo encoder.

Thus, for each quadrant, there is only one point per concentric circle and the phase $\varphi_m$ of the point m is selected according to a determined criterion, for example, with a constant pitch of π/8 between two points or a zero pitch between the two points on the most remote circles in the same quadrant. This second embodiment is robust when confronted with additive white Gaussian noise because the minimum distance between the transmitted points is large. According to the illustrated example of this second embodiment, the phase $\varphi_m$ is a multiple of π/12 and more specifically $\varphi_0=\varphi_3=\pi/2$, $\varphi_1=\pi/12$ and $\varphi_2=5\pi/12$. This second embodiment as illustrated is highly advantageous because it is compatible with many existing OFDM demodulators capable of demodulating an OFDM/16-QAM modulation. Indeed, for each quadrant, the points are close to those of a conventional 16-QAM constellation, as shown in FIG. 4.

Figure 10:
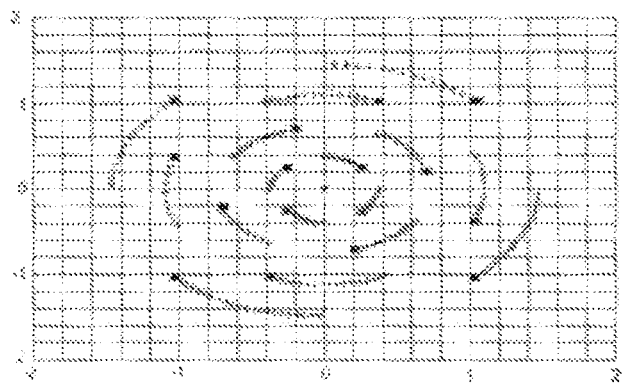
FIG. 10 shows the maximum of the phase variation due, for example, to a Doppler effect that the constellation of FIG. 9 can absorb.

FIG. 10 shows the maximum of the phase variation due, for example, to a Doppler effect that can affect the points of the modulation, illustrated by FIG. 9, during the transmission, which remains compatible with obtaining a correct demodulation upon reception. Within the limit of this maximum, i.e., as long as the phase variation remains within the limit of +π/4 relative to the phase of the transmitted point, the receiver can demodulate the received points of the modulation despite the phase variation between the transmitter and the receiver, and can do so without ambiguity.

This second configuration of a polar constellation allows the reliability to be optimized with regard to the additive white Gaussian noise, with reliability that is related to phase variations that are lower than for the first configuration.

The choice of the pitch p and of the phase $\varphi_m$ of the points of the constellation allows various constellations to be obtained, which promotes the reliability with regard to the phase variations or the reliability with regard to the additive white Gaussian noise.

Figure 11:
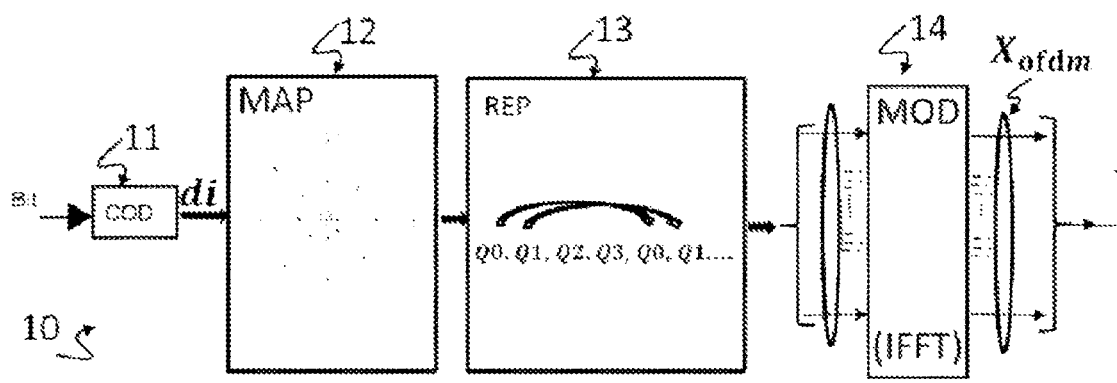
FIG. 11 is a simplified diagram of a baseband transmission chain according to one embodiment of the invention.

FIG. 11 is a simplified diagram of a baseband transmission chain representing the essential steps of a method 10 according to the invention. The encoder COD carries out channel encoding 11 according to known techniques. The chain can include an interleaver for interleaving the encoded data. The binary stream at the input of the mapper is mapped 12 according to known techniques to the points of a constellation. The repetition 13 occurs between the binary symbol encoder, also called mapper MAP, and the modulator MOD, which generates 14 multi-carrier symbols $X_{ofdm}$. The OFDM-type modulator MOD conventionally implements an FFT of size N corresponding to the number of sub-carriers.

Figure 12:
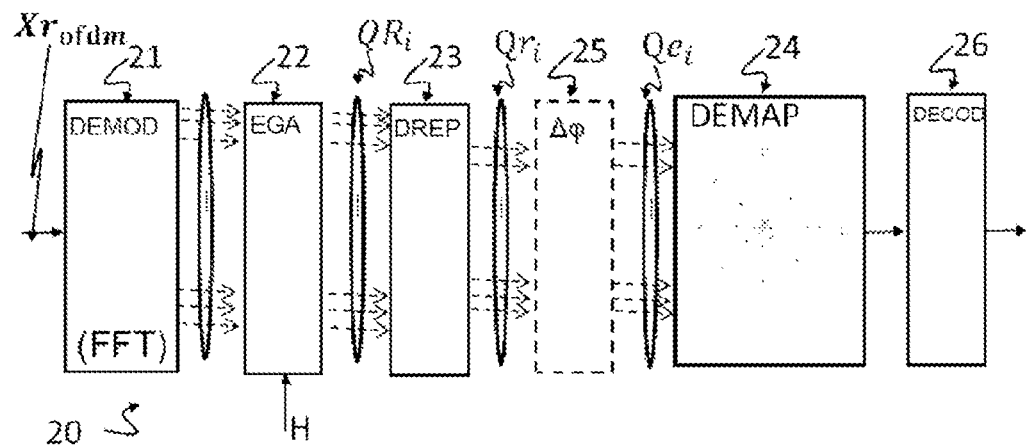
FIG. 12 is a simplified diagram of a baseband reception chain according to one embodiment of the invention.

FIG. 12 is a simplified diagram of a baseband reception chain representing the essential steps of a reception method 20 according to the invention.

The received multi-carrier symbols $Xr_{ofdm}$, are demodulated 21 by a demodulator DEMOD, which carries out the inverse operation of the modulator upon transmission. An OFDM-type demodulator conventionally implements an IFFT of size N corresponding to the number of sub-carriers.

After demodulation, the symbols are conventionally equalized 22, i.e., they are weighted with the coefficients of the transmission channel H that separates the transmitter from the receiver. Knowing the repetition pattern used for transmission, a symbol and its repetitions are added together and normalized 23 by the module DREP before being transmitted to the demapper DEMAP, which implements 24 the inverse function of the mapper MAP.

Figure 13:
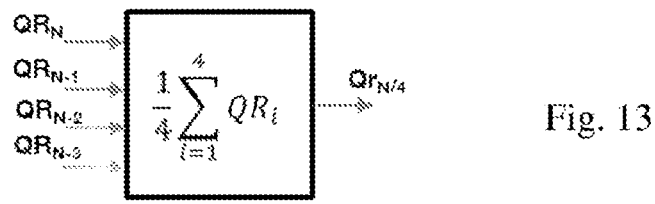
FIG. 13 is a diagram of an embodiment of the processing carried out on the repetitions by the module DREP.

FIG. 13 is a diagram of an example of exploiting the repetitions carried out by the module DREP. This module DREP knows the repetition pattern used for transmission. The example relates to a repetition with a rate η/4 That corresponds, for example, to the previously provided example of a repetition upon transmission with the pattern: Q0, Q0, Q0, Q0, Q1, Q1, Q1, Q1, Q2, Q2, Q2, Q2, Q3, Q3, Q3, Q3.

Upon reception, the four occurrences of the same received symbol are summed and the sum is normalized, i.e., divided by four, in order to obtain the symbol $Qr_{(i)}$, for example, $$Qr_{(1)} = \frac{1}{4} \sum_{i=1}^{4} QR_{(i)}.$$

This normalized summation allows gains in terms of the noise ratio.

In the case of polar constellations used on transmission according to one embodiment of the invention, it is possible to further improve the reception performance capabilities with respect to the QAM constellations by determining 25 a phase error by the module Δφ, shown as dashed lines in FIG. 12.

The coordinates on the Re(z) and Im(z) axes of the received constellation points $Qr_{(i)} = ar(i)e^{j\varphi r(i)} + b(i)$ can be written as follows:

$$Xr(i) = ar(i) \cdot \cos(\varphi r(i)) + bx(i)$$

$$Yr(i) = ar(i) \cdot \sin(\varphi r(i)) + by(i),$$

with bx and by being additive white Gaussian noises on the I(Re(z)) and Q(Im(z)) channels.

For a polar constellation, the OFDM-type receiver can demodulate the data of the constellation by determining only the amplitude (ar(i)) of the received point for a quadrant. For example, for the spiral constellation illustrated in FIG. 7, the quadrant equals 2π, there is only one point on a circle. By comparing the amplitude ar(i) of a received point with the amplitude of the various points $a_{(i)}e^{j\varphi(i)}$ of the polar constellation, the module Δφ can determine the point for which the amplitude is the closest, this point is that originally transmitted, denoted $a_{(1)}e^{j\varphi(1)}$, for example. The phase of the point of origin is therefore known, this is $\varphi_{(1)}$.

The projections on the Re(z) and Im(z) axes of the received point, for example, $Qr_{(1)}$, yield: $Xr(1) = ar(1) \cdot \cos(\varphi r(1)) + bx(1)$ and $Yr(1) = ar(1) \cdot \sin(\varphi r(1)) + by(1)$.

The estimate of φr is provided by:

$$\varphi r \approx \arctg\left(\frac{ar(1) \cdot \sin(\varphi r(1)) + by(1)}{ar(1) \cdot \cos(\varphi r(1)) + bx(1)}\right).$$

The estimate of the phase error on the received point Qr(1) is then provided by: $\Delta\varphi(1) = \varphi_1 - \varphi r(1) + b\varphi(1)$, with bφ(1) being the noise on the estimate.

For the constellation illustrated in FIG. 9, the operations described above for the spiral constellation (quadrant of 2π) are carried out for a quadrant of π/4 after having identified the quadrant to which the received point belongs.

For a received multi-carrier symbol $Xr_{ofdm}$, the phase error estimate can be repeated by the module Δφ for each of the points output from the module DREP: $\Delta\varphi_{(i)} = \varphi_i - \varphi r(i) + b\varphi(i)$.

By summing the various phase error estimates for several of the points, this allows an improvement in the estimation of the phase error to be obtained and the influence of the white noise to be reduced:

$$\Delta\varphi_p = \frac{1}{N_p}\sum_{i=1}^{N_p}\Delta\varphi_{(i)},$$

with $N_p$ being the number of points used to estimate this common phase error.

The number $N_p$ can be equal to the number of points at the output of the module DREP in the case of a TDD (Time Division Duplex) mode transmission. Indeed, in a TDD mode, a multi-carrier symbol $Xr_{ofdm}$ is intended for a single user, i.e., a single receiver. In this case, if the receiver is moving, only one Doppler effect affects the multi-carrier symbol $Xr_{ofdm}$ and therefore all the points at the output of the module DREP.

The number $N_p$ can correspond to a sub-set of the sub-carriers reserved for the downlink or uplink in FDD (Frequency Division Duplex) mode. For example, in the case of the 4G standard, $N_p$ is deduced from a multiple of 12 sub-carriers since each user served by the same base station benefits from a multiple of 12 sub-carriers. With the averaging on the phase error estimates occurring after the averaging on the repetitions, the number $N_p$ is less than the number of sub-carriers allocated to a user.

The $N_p$ points of a multi-carrier symbol $Xr_{ofdm}$, then can be corrected by the estimate of the common phase error.

This correction can be carried out in the frequency domain by the module Δφ, as shown in FIG. 12.

Figure 14:
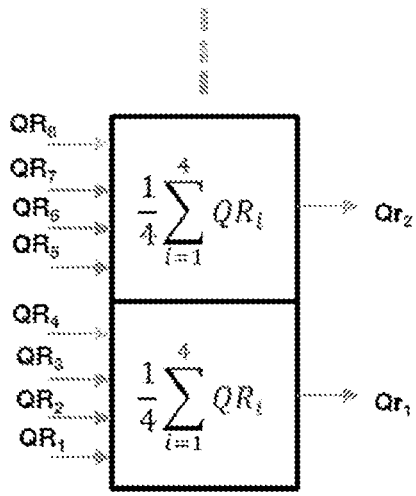
FIG. 14 is a diagram for an FDD mode of the correction carried out by a module $\Delta\varphi$ of the receiver of a user UE1.
Figure 14:
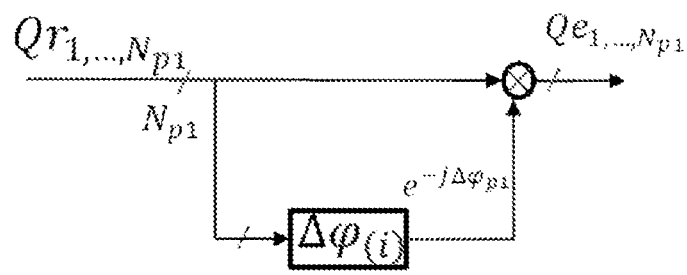

FIG. 14 is a diagram for an FDD mode of the correction carried out by a module Δφ of a user UE1, for which $N_q$ sub-carriers are intended from among the N sub-carriers of a multi-carrier symbol $X_{ofdm}$ transmitted by a base station. After the module DREP, there are $N_{p1}$ points to be considered for the phase error estimate $\Delta\varphi_{(i)}$ and for the computation of the average in order to obtain the common phase error $\Delta\varphi_{p1}$. Each point $Qr_{1, \ldots, Np1}$ is weighted by the common phase error $e^{-j\Delta\varphi_{p1}}$ in order to obtain a corrected point $Qe_{1, \ldots, Np1}$.

Figure 15:
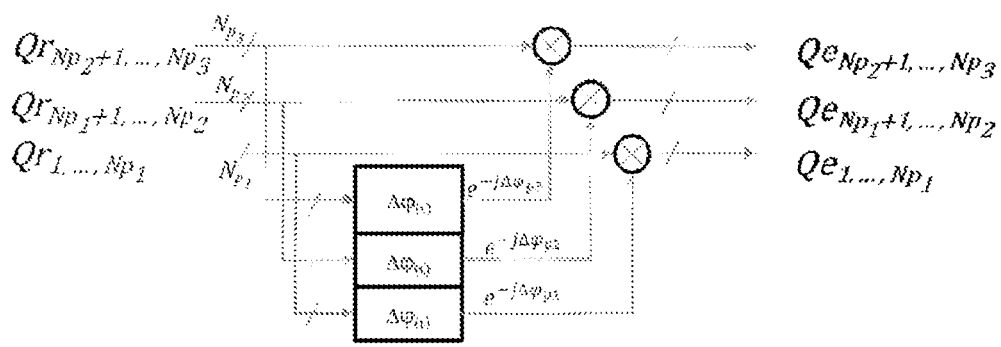
FIG. 15 is a diagram for an FDD mode of the correction carried out by a module $\Delta\varphi$ of a base station that receives several users.

FIG. 15 is a diagram for an FDD mode of the correction carried out by a module Δφ of a base station that receives several users, three according to the example, UEj, j=1, 2 or 3, in the same multi-carrier symbol time.

Each user UEj is assigned $N_{qj}$ sub-carriers from among the N sub-carriers. After the module DREP there are $N_{pj}$ points to be considered per user UEj for the phase error estimate $\Delta\varphi_{(i)}$ and for the computation of the average in order to obtain the common phase error $\Delta\varphi_{pj}$. For the user UE1, each point from among the points $Qr_{1, \ldots, Np1}$ intended for them is weighted by the common phase error $e^{-j\Delta\varphi_{p1}}$ in order to obtain a corrected point $Qe_{1, \ldots, Np1}$. For the user UE2, each point from among the points $Qr_{Np1+1, \ldots, Np2}$ intended for them is weighted by the common phase error $e^{-j\Delta\varphi_{p2}}$ in order to obtain a corrected point $Qe_{Np1+1, \ldots, Np2}$. For the user UE3, each point from among the points $Qr_{Np2+1}, \ldots, _{Np3}$ intended for them is weighted with the common phase error $e^{-j\Delta\varphi_{p3}}$ in order to obtain a corrected point $Qe_{Np2+1}, \ldots, _{Np3}$.

Figure 16:
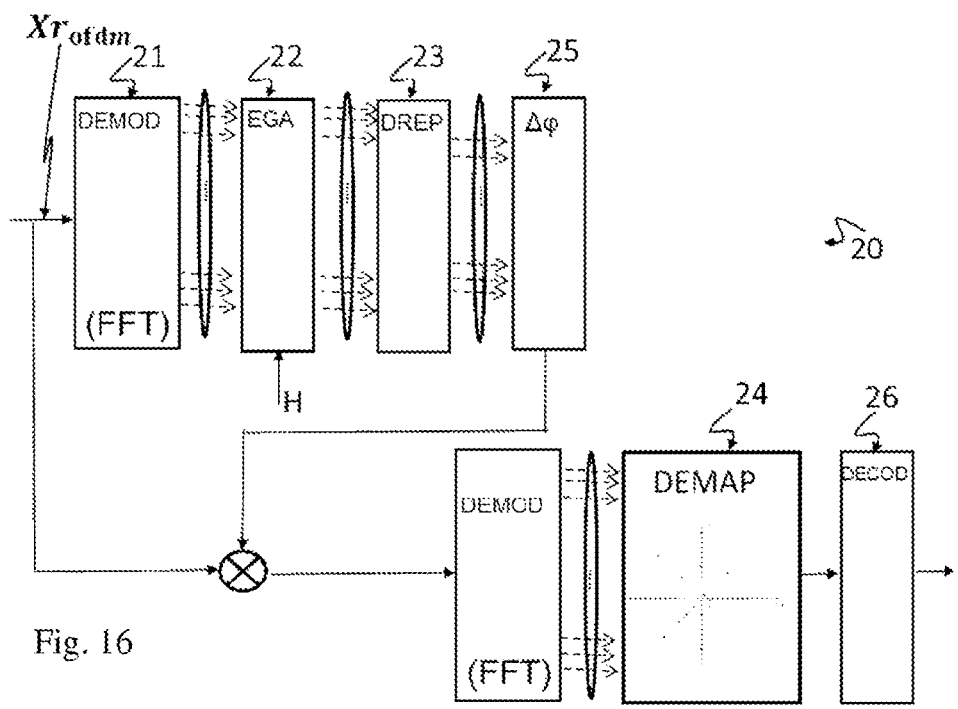
FIG. 16 is a simplified diagram of a baseband reception chain for a TDD mode with a phase correction carried out in the time domain according to one embodiment of the invention.

In the case of a TDD (Time Division Duplex) mode transmission, the common phase error correction can be carried out in the frequency domain as for the FDD mode, but also in the time domain by the multiplier ⊗, as shown in FIG. 16, This temporal correction requires a reception chain with two branches, a first branch that allows the common phase error to be determined by implementing steps 21, 22, 23 and 25 already described with reference to FIG. 12, a second branch that comprises the multiplier ⊗, another demodulator DEMO identical to that of the first branch, the demapper DEMAP and the decoder DECOD. This other demodulator implements a demodulation 21, the output of which supplies the demapper that carries out the demapping 24. The output of the demapper can supply a decoder DECOD that implements the decoding 26.

Figure 17:
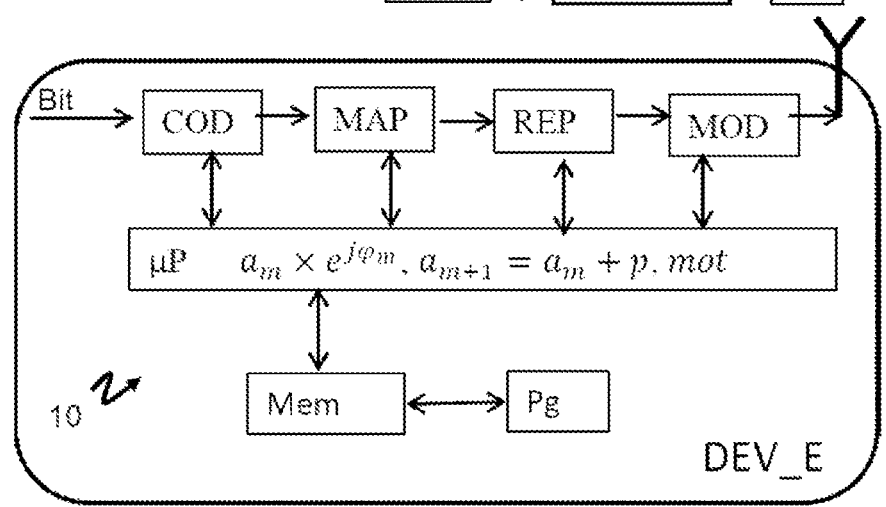
FIG. 17 is a diagram of the simplified structure of an embodiment of an equipment according to the invention capable of implementing a telecommunication method according to the invention.

The simplified structure of an embodiment of an equipment according to the invention capable of implementing a telecommunication method according to the invention is illustrated in FIG. 17. This equipment DEV_E equally can be a base station and a mobile terminal.

The equipment DEV_E comprises a transmitter (not shown), a microprocessor μP, the operation of which is controlled by running a program Pg, the instructions of which allow a telecommunication method 10 according to the invention to be implemented. The equipment DEV_E further comprises an encoder COD, a mapper MAP, a repeater REP, a modulator MOD, a memory Mem comprising a buffer memory. A modulator MOD of the OFDM type is conventionally produced by implementing an inverse Fourier transform IFFT.

Upon initialization, the code instructions of the program Pg are loaded, for example, into the buffer memory Mem before being executed by the processor RP. The microprocessor μP controls the various components: encoder COD, mapper MAP, repeater REP, modulator MOD, transmitter.

The configuration of the equipment comprises at least the type of modulation and its order, the pattern mot of the repetitions or the rate and an optional interleaving parameter and/or an optional puncturing parameter. The order of the modulation determines the number of points of the constellation. When the mapper implements a polar constellation, the configuration of the equipment further comprises at least the pitch of the constellation as well as the value of $a_1$.

Thus, by executing the instructions, the microprocessor μP controls:

encoding of the input bits, mapping the encoded data to the points of the constellation in order to generate symbols, repeating the symbols according to the pattern mot and mapping the repeated symbols to the N sub-carriers of the modulator in order to obtain multi-carrier symbols after modulation;

the transmitter transmitting the radio signal representing the multi-carrier symbols.

When the constellation is polar, by executing the instructions, the microprocessor μP:

determines the polar coordinates of the points of the constellation: $a_n \times e^{j\varphi_n}$, n=1, ..., N, such that $a_{n+1}=a_n+p$, p>0.

Figure 18:
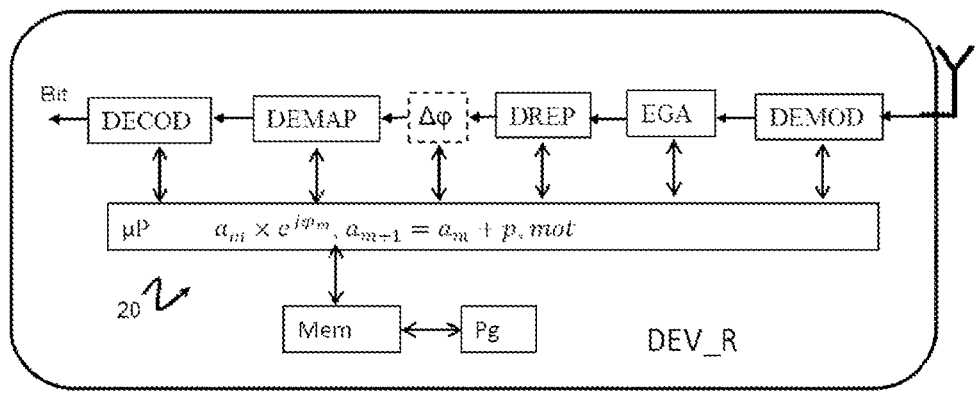
FIG. 18 is a diagram of the simplified structure of an embodiment of an equipment according to the invention capable of implementing a reception method according to the invention.

The simplified structure of an embodiment of an equipment according to the invention capable of implementing a reception method according to the invention is illustrated in FIG. 18. This equipment DEV_R equally can be a base station and a mobile terminal.

The equipment DEV_R comprises a receiver (not shown), a microprocessor μP, the operation of which is controlled by running a program Pg, the instructions of which allow a reception method 20 according to the invention to be implemented. The equipment DEV_R further comprises a demodulator DEMOD, an equalizer EGA, a derepeater DREP, a demapper DEMAP, a decoder DECOD, a memory Mem comprising a buffer memory. When the demodulator DEMOD is of the OFDM type, it conventionally implements a Fourier transform FFT. When the constellation is polar, the equipment DEV_R can further comprise a phase error corrector Δφ.

Upon initialization, the code instructions of the program Pg are loaded, for example, into the buffer memory Mem before being executed by the processor μP. The microprocessor μP controls the various components: demapper DEMAP, demodulator DEMOD, receiver.

The receiver receives a radio signal representing multi-carrier symbols. The demodulator DEMOD implements the inverse operation of the modulator MOD. The demapper DEMAP implements the inverse operation of the mapper MAP.

The configuration of the equipment comprises at least the type of modulation and its order, the pattern mot of the repetitions or the rate and an optional interleaving parameter and an optional puncturing parameter. When the mapper implements a polar constellation, the configuration of the equipment further comprises at least the pitch p of the constellation as well as the value of $a_1$.

Thus, by executing the instructions, the microprocessor μP controls the various components for:

receiving the radio signal representing the multi-carrier symbols;

the demodulator DEMOD demodulating the multi-carrier symbols in order to estimate the symbols mapped to the various carriers;

the equalizer EGA weighting the symbols of the coefficients of the transmission channel;

the derepeater DREP averaging the repetitions of the same symbol knowing the repetition pattern (or knowing the rate and an optional interleaving parameter and an optional puncturing parameter);

the demapper DEMAP demapping the symbols of the constellation in order to estimate the data Bit.

When the constellation is polar, by executing the instructions, the microprocessor determines the polar coordinates of the points of the constellation: $a_n \times e^{j\varphi_n}$, n=1, ..., N, such that $a_{n+1}=a_n+p$, p>0;

controls the phase error corrector Δφ in order to estimate the phase error $\Delta\varphi_{(i)}$ on in order to compute the average and to obtain the common phase error $\Delta\varphi_p$ and to correct the symbols of the constellation before demapping.

Consequently, the invention also applies to one or more computer program(s), in particular a computer program on or in an information medium, suitable for implementing the invention. This program can use any programming language, and can be in the form of source code, object code, or intermediate code between source code and object code, such as in a partially compiled format, or in any other desirable format for implementing a method according to the invention.

The information medium can be any entity or device capable of storing the program. For example, the medium can comprise a storage means, such as a ROM, for example, a CD-ROM or a microelectronic circuit ROM, or even a magnetic recording means, for example, a USB key or a hard disk.

Furthermore, the information medium can be a transmissible medium, such as an electrical or optical signal, which can be routed via an electrical or optical cable, by radio or by other means. The program according to the invention particularly can be downloaded over an Internet type network.

Alternatively, the information medium can be an integrated circuit in which the program is incorporated, with the circuit being adapted to execute or to be used to execute the method in question.

Figure 19:
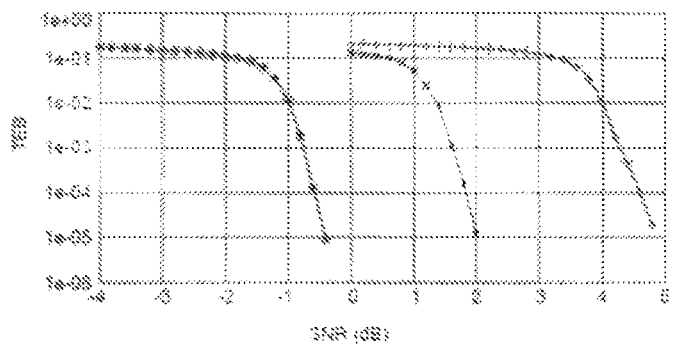
FIG. 19 shows curves that illustrate the performances obtained in terms of binary error rate (TEB) as a function of the signal-to-additive white Gaussian noise ratio (SNR) obtained with a conventional technique in the case of a 16-QAM constellation.
Figure 20:
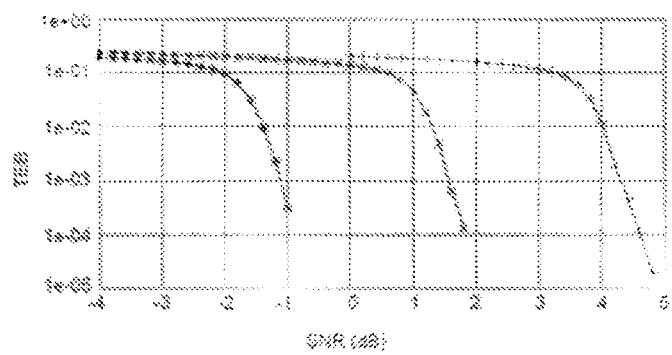
FIG. 20 shows curves that illustrate the performance obtained in terms of binary error rate (TEB) as a function of the signal-to-additive white Gaussian noise ratio (SNR) obtained with a method according to the invention in the case of a 16-QAM constellation.
Figure 21:
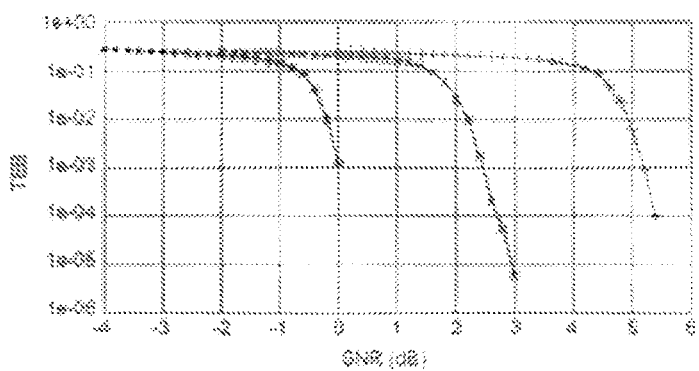
FIG. 21 shows curves that illustrate the performances obtained in terms of binary error rate (TEB) as a function of the signal-to-additive white Gaussian noise ratio (SNR) obtained with a method according to the invention in the case of a 16-point polar constellation.

The curves of FIGS. 19, 20 and 21 illustrate the performances obtained in terms of binary error rate (TEB) as a function of the signal-to-additive white Gaussian noise ratio (SNR) for code rate of ½, which is the mother code of a double-binary turbo code (1,504 bits), of ¼ and of ⅛. These curves are respectively obtained with a conventional technique and the method according to the invention in the case of a 16-QAM constellation and in the case of a 16-point polar constellation. The comparison of the curves shows that the results are comparable or even slightly better with a method according to the invention and a 16-QAM and are much better with a method according to the invention and a polar constellation.

Figure 22:
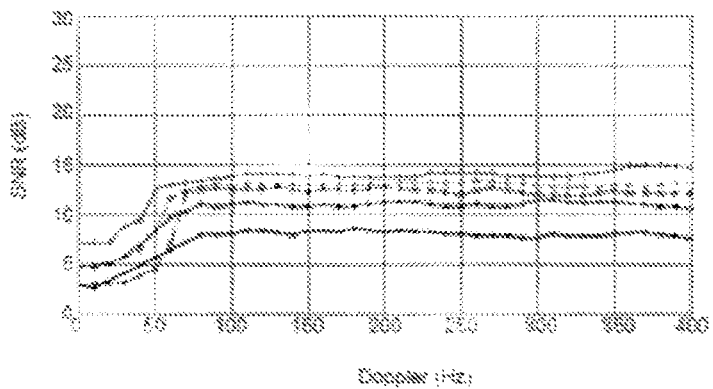
FIG. 22 shows curves that provide the minimum SNR level as a function of the Doppler effect in order to obtain a binary error rate of less than $5.10^{-5}$ at the output of the system obtained with a method according to the invention for the rows formed by squares and obtained with a conventional method for the curves formed by crosses.

The curves of FIG. 22 provide the minimum SNR level as a function of the Doppler effect in order to obtain a binary error rate of less than 5.10-5 at the output of the system. The rows formed of the squares are obtained with a method according to the invention in the case of a 16-point polar constellation (order 16) for rates of ¼ and ⅛. The curves formed of crosses are obtained with a conventional method and a polar constellation for rates of ½, ¼ and ⅛. By combining the method according to the invention and a polar constellation, the gain in terms of SNR is much greater than for a conventional method. After 70 Hz of Doppler shift, the performances obtained with the method according to the invention are much better than with a conventional method.

Although the present disclosure has been described with reference to one or more examples, workers skilled in the art will recognize that changes may be made in form and detail without departing from the scope of the disclosure and/or the appended claims.

The invention claimed is:

1. A telecommunication method comprising:
encoding data at a rate r1 with a binary encoder;
mapping the encoded data with a mapper to points of a constellation in order to obtain symbols;
performing a multi-carrier modulation with a modulator with N sub-carriers, which maps the obtained symbols to the N sub-carriers to generate multi-carrier symbols;
transmitting the multi-carrier symbols; and
repeating symbols of the obtained symbols in order to obtain several occurrences of a same symbol before mapping the obtained symbols to the N sub-carriers of the modulator and in order to map several occurrences of the same symbol to several sub-carriers respectively.

2. The telecommunication method as claimed in claim 1, wherein the same number of repetitions is applied to all the obtained symbols before mapping the obtained symbols to the N sub-carriers.

3. The telecommunication method as claimed in claim 1, wherein, among N of the obtained symbols mapped to the N sub-carriers, at least one symbol is not repeated or a number of occurrences of the at least one symbol is different from a number of occurrences of another symbol.

4. The telecommunication method as claimed in claim 1, wherein a number of repetitions of the obtained symbols is determined in order to obtain a rate r2 that is less than r1.

5. The telecommunication method as claimed in claim 1, further comprising:
interleaving, after the repeating, symbols of the obtained symbols mapped to the N sub-carriers.

6. The telecommunication method as claimed in claim 1, wherein the constellation comprises a set of M points, wherein coordinates of which expressed in polar form $a_m \times e^{j\varphi_m}$, m=0, ..., M−1, called polar coordinates with reference to a two-axis representation, are determined such that $a_{m+1}=a_m+p$, p>0, with p being a real number representing an amplitude pitch of the constellation.

7. The telecommunication method as claimed in claim 6, wherein the amplitude pitch is a parameter.

8. The telecommunication method as claimed in claim 6, wherein the two axes delimit quadrants and the polar coordinates are determined per quadrant:

$$a_{m+1} = a_m + p, m = 0, \ldots, \frac{M}{4} - 1.$$

9. The telecommunication method as claimed in claim 8, such that for each quadrant $$\varphi_{m+1} = \varphi_m, m = 0, \ldots, \frac{M}{4} - 1.$$

10. The telecommunication method as claimed in claim 8, such that M=16, p=1 and such that for each quadrant $\varphi_m = \alpha \times \pi/12$, with $\alpha$ being a natural number.

11. The telecommunication method as claimed in claim 6, wherein the two axes delimit quadrants and the polar coordinates are determined per set of two quadrants:

$$a_{m+1} = a_m + p, n = 0, \ldots, \frac{M}{2} - 1.$$

12. The telecommunication method as claimed in claim 6, wherein the two axes delimit quadrants and such that for two quadrants taken together $$\varphi_{m+1} = \varphi_m, m = 0, \ldots, \frac{M}{2} - 1.$$

13. The telecommunication method as claimed in claim 6, wherein the polar coordinates are further determined such that $\varphi_{m+1}=\varphi_m+p'=\varphi_m+p''''\times\pi$, with p'''' being a non-zero real number.

14. The telecommunication method as claimed in claim 6, wherein the polar coordinates are further determined such that $\varphi_m=\varphi$ for m=0, ..., M−1.

15. The telecommunication method as claimed in claim 1, wherein the modulation is implemented by an inverse Fourier transform (IFFT).

16. A reception method comprising:
demodulating a received multi-carrier symbol in order to estimate symbols of a constellation mapped to the multi-carriers, such that multiple occurrences of a same symbol are respectively mapped to multiple carriers;

averaging the multiple occurrences of the same symbol in order to improve estimation of the symbol;

demapping the symbols in order to estimate data mapped to these constellation symbols; and decoding the data.

17. The reception method as claimed in claim 16, wherein the constellation comprises a set of M points, wherein coordinates of which expressed in polar form $a_m \times e^{j\varphi_m}$, m=0, ..., M−1, called polar coordinates with reference to a two-axis representation, are determined such that $a_{m+1}=a_m+p$, p>0, with p being a real number representing an amplitude pitch of the constellation, and wherein the method further comprises:

estimating, per constellation symbol, a phase error by comparing projections on quadrature axes of the symbol with the points of the constellation;

correcting the constellation symbols by a common phase error after averaging the estimated phase errors.

18. A telecommunication equipment comprising:

a binary encoder of rate r1;

a mapper for mapping input data to points of a constellation and for generating symbols;

a modulator with N sub-carriers for modulating a block of N symbols made up of L occurrences of L symbols, respectively, and at least one other occurrence of at least one of the L symbols, with all the L occurrences and other occurrences defining a new rate r2=r1×L/N, for generating multi-carrier symbols; and a transmitter for transmitting a radio signal representing the multi-carrier symbols.

19. The telecommunication equipment as claimed claim 18, wherein the constellation comprises a set of M points, the coordinates of which expressed in polar form, $a_m \times e^{j\varphi_m}$, m=0, ..., M−1, called polar coordinates with reference to a two-axis representation, are determined such that $a_{m+1}=a_m+p$, p>0, with p being a real number representing an amplitude pitch of the constellation.

20. A telecommunication equipment comprising:

a demodulator with N sub-carriers for demodulating a received multi-carrier symbol and estimating N symbols of a constellation mapped to the multi-carriers, such that multiple occurrences of the same symbol are respectively mapped to multiple carriers;

derepeater for averaging the multiple occurrences of the same symbol and for improving the estimation of this symbol;

demapper for demapping L constellation symbols and estimating data mapped to these L constellation symbols, 0<L<N; and a decoder for decoding the data.

* * * * *